3,015,550
PLANT GROWTH INHIBITION PROCESS EMPLOYING 2-CHLORO-6-NITROTOLUENE
Thomas J. McMahon, % McMahon Brothers Inc., Box 261, Tenafly, N.J.
No Drawing. Filed Apr. 28, 1959, Ser. No. 809,365
6 Claims. (Cl. 71—2.3)

The present invention relates to a process for the treatment of soil for the prevention of plant growth and in particular to such a treatment involving the application of a chemical which becomes distributed in a layer of the soil and which persists for long periods of time and is not bleached out by rainfall and the action of the elements.

The control of plant growth is an expensive and continuous operation which involves the use of a considerable quantity of labor. This problem is encountered particularly by highway departments in the maintenance of highway right-of-ways. A major portion of highway right-of-ways can be maintained adequately by the use of mechanical mowing equipment which greatly reduces the amount of labor required for maintenance.

There are, however, certain areas of highway right-of-ways which cannot be efficiently maintained by mechanical equipment such as the area around guard rails, culverts, etc. The maintenance of the area in the vicinity of these fixtures to control plant growth involves the expenditure of labor, and consequently of funds, which is quite out of proportion to the relative area involved.

It is, therefore, desirable to provide some means of controlling or preventing plant growth in these relatively small areas which can be carried out more efficiently. It is particularly desirable, if a growth inhibition treatment is to be used, that the effects of the treatment be highly persistent, preferably for several years. Obviously, a treatment which merely involves the destruction of existing plant growth would be unsatisfactory, as it would have to be repeated at least every growing season as the destroyed plant growth is replaced by the ordinary propagation processes.

The present invention utilizes a soil treatment which renders the soil antagonistic to plant growth and substantially prevents the regrowth of plants in the area treated. Incidentally, of course, the existing plant growth is also killed.

The treatment of soil by chemicals to prevent plant growth for an extended period of time has previously been unfeasible. In particular, chemicals which inhibit plant growth and which are water soluble are found to leach out due to the dissolving of the chemical in rain water which soaks through the soil and carries the chemical away.

The present invention provides a treatment for soil with a chemical, 2-chloro-6-nitrotoluene, $C_7H_6NO_2Cl$, which is not water soluble and is in crystalline form at ordinary tempeartures and will normally persist in the soil without leaching for several years. This chemical is nevertheless an effective inhibitor of all normal types of plant growth when applied by an appropriate process in the proper concentration. This characteristic of the chemical was found from observation and no biological explanation of its characteristics is advanced.

It will be appreciated that while a major application of the process is contemplated to be the control of plant growth on highway right-of-ways, it is of course adaptable for use in any situation where the growth of plant life in a particular area of soil is desired to be prevented.

In addition to the above explained features and advantages of the invention, it is an object of the present invention to provide a process for the treatment of soil to prevent the growth of plant life.

It is another object of the present invention to provide a process for the treatment of soil to prevent the growth of plant life, which treatment is effective for a long period of time without renewal.

It is a further object of the present invention to provide a process for the treatment of soil to prevent the growth of plant life, particularly small plant life, such as grasses and weeds.

The preferred method of treating soil for the inhibition of plant growth in accordance with the present invention involves the use of 2-chloro-6-nitrotoluene compound, or its equivalent, in solution in a carrier liquid. A suitable carrier for the compound is fuel oil.

The 2-chloro-6-nitrotoluene compound, chemical formula $C_7H_6NO_2Cl$, is a crystal having a melting point of approximately 37° C. which is not soluble in water. The compound is soluble in oil thus allowing relatively inexpensive fuel oil to be used as the carrier for the compound.

The compound is non-corrosive but it has a flash point of 111° C. and precautions against fire should be taken when the chemical compound is to be handled in its liquid state.

It is preferred that the 2-chloro-6-nitrotoluene compound be dissolved in the proportions of 1½ pounds to 1 gallon of fuel oil or other carrier liquid. This is readily accomplished by melting the compound from its crystalline form to its liquid form and mixing the compound with the liquid carrier, which also should preferably be heated above the melting point of the compound.

The solution of compound in the carrier is preferably applied to the soil to be treated while warm, approximately 37° C. (100° F.), for example.

The mixture of compound and carrier is applied at the rate of approximately one quart per square yard on soil of average absorption characteristics. The application of the mixture is made at such a rate to prevent runoff of the mixture and to allow the surface layer of the soil to become saturated with the mixture. The depth to which the soil will become saturated will vary under different conditions but will normally be less than approximately one inch.

Specialized apparatus is not required for treating soil according to the present process. Since the mixture is non-corrosive, it may be applied by use of any convenient means ranging from an ordinary garden sprinkling can to an elaborate self-propelled spraying apparatus. Accordingly, no apparatus is shown or described in detail for carrying out the process.

The mixture may be applied to soil which is at freezing or near-freezing temperature. When the mixture is applied warm, the fact that the soil is frozen will not prevent the saturation of the soil with the mixture.

It will be appreciated that when the compound and carrier mixture is applied to the soil in the proper manner, the compound becomes intimately mixed throughout the upper layer of the soil and in view of the fact that the compound is not water soluble it will not be substantially disturbed by the insoak of rain water or other action of the elements. The compound will remain in place in spite of any action short of actually removing the top layer of the soil in which it is distributed.

It will be understood that when the concentration of the 2-chloro-6-nitrotoluene is specified, that the ordinary commercial concentration of the compound, such as is available from Du Pont Chemical Company under the trade name "NC Compound," is considered as the basis for determining the proportions of compound and carrier liquid.

It will be appreciated that a stronger concentration of the 2-chloro-6-nitrotoluene compound can be dispersed in the soil than that described above if it is so desired. However, in ordinary circumstances the above-described concentration will be adequate and of course the use of a stronger concentration will increase the expense of the treatment. Other carrier fluids than fuel oil may be utilized, such as used crankcase or lubricating oil, kerosene, or the like. Any other suitable fluid in which the compound is soluble may be utilized as a carrier.

From the above explanation, it will be understood that the process described results in the dispersion of 2-chloro-6-nitrotoluene compound in the surface layer of the treated soil in a concentration of approximately eight ounces per cubic foot or more. Any other suitable process serving to so disperse the compound substantially uniformly through the appropriate depth of soil surface might also be used.

It will be understood that there is no claim made to invention of the composition of the material, 2-chloro-6-nitrotoluene compound; this compound has been known and has been used, for example, for termite control. The invention claimed is the process involving the new use of the known composition of matter, 2-chloro-6-nitrotoluene compound, or its equivalent, for the inhibition of plant growth.

From the foregoing explanation, it will be understood that a process is provided for the inhibition of plant growth which is particularly effective and long lasting and provides numerous advantages over previous processes, such as mowing, burning, chemical treating, or the like. Variations and modifications of the particular process described will be obvious to those skilled in the art, such as the substitution of equivalent materials for those described, and variations in the method of application. Accordingly, the invention is not to be construed to be limited to the particular process described, but is to be limited solely by the appended claims.

What is claimed is:

1. A process for the inhibition of plant growth in soil comprising substantially saturating a surface layer of the soil not less than ⅛-inch deep by applying to the surface of the soil a solution of not less than approximately 1½ pounds of the chemical compound 2-chloro-6-nitrotoluene per gallon in a carrier liquid in which said compound is soluble, said solution being applied at the rate of not less than approximately 1 quart per square yard and at a temperature of not less than approximately 37° C., said soil being at a temperature of less than 37° C.

2. A process for the inhibition of plant growth in soil comprising substantially saturating a surface layer of the soil not less than ⅛-inch deep by applying to the surface of the soil a solution of not less than approximately 1½ pounds of the chemical compound 2-chloro-6-nitrotoluene per gallon in a carrier liquid in which said compound is soluble, said solution being applied at a rate of not less than approximately 1 quart per square yard to obtain a concentration of said compound of not less than approximately 1 pound per 2 cubic feet of soil.

3. A process for the inhibition of plant growth in soil comprising substantially saturating a surface layer of the soil not less than ⅛ inch deep by applying to the surface of the soil a solution of not less than 1½ pounds of the chemical compound 2-chloro-6-nitrotoluene per gallon in a carrier liquid in which said compound is soluble, said solution being applied at a rate to obtain a concentration of compound of not less than approximately 1 pound per 2 cubic feet of soil, said mixture being applied at a temperature of not less than approximately 37° C., said soil being at a temperature of less than 37° C.

4. A process for the inhibition of plant growth in soil comprising substantially saturating a surface layer of the soil not less than ⅛ inch deep by applying to the surface of the soil a solution of not less than approximately 1½ pounds of the chemical compound 2-chloro-6-nitrotoluene per gallon of carrier liquid in which said compound is soluble, said solution being applied at the rate of not less than approximately 1 quart per square yard.

5. A process for the inhibition of plant growth in soil comprising substantially saturating a surface layer of the soil not less than ⅛ inch deep by applying to the surface of the soil a solution of approximately 1½ pounds of the chemical compound 2-chloro-6-nitrotoluene per gallon of carrier liquid in which said compound is soluble, said solution being applied at the rate of not less than approximately 1 quart per square yard.

6. A process for the inhibition of plant growth in soil comprising substantially saturating a surface layer of the soil not less than ⅛ inch deep by applying to the surface of the soil a solution of approximately 1½ pounds of the chemical compound 2-chloro-6-nitrotoluene per gallon of carrier liquid in which said compound is soluble, said solution being applied at the rate of not less than approximately 1 quart per square yard, said mixture being applied at a rate to obtain a concentration of said compound of not less than approximately 1 pound per 2 cubic feet of soil in said surface layer.

References Cited in the file of this patent

UNITED STATES PATENTS 2,343,415    Kaufert _____ Mar. 7, 1944

OTHER REFERENCES

Simonet et al.: "Societe de Biologie," vol. 131, 1939, pp. 222–224.

Jones et al.: "J. Sci. Food Agri.," vol. 5, No. 1, January 1954, pages 38 to 43.